(12) United States Patent
Akolkar et al.

(10) Patent No.: US 11,057,231 B2
(45) Date of Patent: Jul. 6, 2021

(54) PRESCRIPTIVE MEETING RESOURCE RECOMMENDATION ENGINE USING CALENDAR INVITE CONTENT

(71) Applicant: International Business Machines Corporation, Armonk, NY (US)

(72) Inventors: Rahul P. Akolkar, Austin, TX (US); Brian E. Bissell, Fairfield, CT (US); Kristi A. Farinelli, Philadelphia, PA (US); Joseph L. Sharpe, III, Waxhaw, NC (US); Stefan Van Der Stockt, Sandhurst (ZA); Xinyun Zhao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 16/114,604

(22) Filed: Aug. 28, 2018

(65) Prior Publication Data

US 2020/0076634 A1 Mar. 5, 2020

(51) Int. Cl.
| | | |
|---|---|---|
| G06F 15/16 | (2006.01) | |
| H04L 12/18 | (2006.01) | |
| H04L 29/06 | (2006.01) | |
| H04L 12/911 | (2013.01) | |
| G06Q 10/10 | (2012.01) | |
| G06F 40/20 | (2020.01) | |

(52) U.S. Cl.
CPC .......... *H04L 12/1818* (2013.01); *G06F 40/20* (2020.01); *G06Q 10/1095* (2013.01); *H04L 47/72* (2013.01); *H04L 65/1069* (2013.01); *H04L 65/403* (2013.01)

(58) Field of Classification Search
CPC . H04L 12/1818; H04L 47/72; H04L 65/1069; H04L 65/403; G06F 40/20; G06Q 10/1095
USPC ........................................................ 709/204
See application file for complete search history.

(56) References Cited

U.S. PATENT DOCUMENTS

| | | | |
|---|---|---|---|
| 8,065,175 B1 * | 11/2011 | Lewis ............ | G06Q 10/063116 705/7.19 |
| 8,214,748 B2 | 7/2012 | Srikanth et al. | |
| 2008/0091785 A1 | 4/2008 | Pulfer et al. | |

(Continued)

*Primary Examiner* — Suraj M Joshi
*Assistant Examiner* — Ayele F Woldemariam
(74) *Attorney, Agent, or Firm* — Maeve M. Carpenter

(57) ABSTRACT

A prescriptive meeting resource recommendation engine automatically learns participant and resource preferences in the context of given meeting input data using natural language features, and automatically recommends all relevant participants and resources (teleconferences, web meetings, links, etc.) to the meeting creator. The engine uses a feature data store to associate historical persons and historical resources with various natural language features, e.g., chargrams. As the host enters text in an invitation template (such as in the title field), the engine extracts current natural language features and computes current participant scores and current resource scores based on the current natural language features. A "forgetfulness" routine is applied to the feature data store to phase out the influence of stale data. After receiving user confirmation, the system takes appropriate action such as electronically sending invitations to the recommended participants and making reservations for the recommended resources.

20 Claims, 5 Drawing Sheets

(56) References Cited

U.S. PATENT DOCUMENTS

| | | |
|---|---|---|
| 2008/0300944 A1 | 12/2008 | Surazski et al. |
| 2009/0198728 A1 | 8/2009 | Davia et al. |
| 2011/0184768 A1 | 7/2011 | Norton et al. |
| 2015/0058425 A1* | 2/2015 | Nathan ................. H04L 65/403 709/206 |
| 2015/0347980 A1 | 12/2015 | White et al. |
| 2016/0005005 A1 | 1/2016 | Dhara et al. |
| 2016/0117624 A1* | 4/2016 | Flores .............. G06Q 10/06393 705/7.39 |
| 2016/0203442 A1 | 7/2016 | Pererira |
| 2017/0236097 A1 | 8/2017 | Smith et al. |
| 2017/0316383 A1* | 11/2017 | Naganathan ....... G06Q 10/1095 |
| 2018/0007100 A1* | 1/2018 | Krasadakis ........ G06Q 10/1095 |
| 2019/0005462 A1* | 1/2019 | Brennan ............ G06Q 10/1095 |

* cited by examiner

56'

| | Person 1 | Person 2 | Person 3 | ... | Person P | Room X | Title 1 | Agenda 1 | Object 1 |
|---|---|---|---|---|---|---|---|---|---|
| Feature 1 | 2.546 | 1.125 | 0 | ... | 0 | 4.5 | 4.5 | 4.5 | 4.5 |
| Feature 2 | 0 | 3.568 | 2.3 | ... | 0 | 0 | 2.353 | 1.54 | 4.1 |
| Feature 3 | 0 | 1.3 | 1.3 | ... | 0 | 0 | 1.3 | 5.4 | 5.4 |
| ... | ... | ... | ... | ... | ... | ... | ... | ... | ... |
| Feature 4 | 0 | 0 | 0 | ... | 4.2 | 0 | 0 | 4.2 | 0 |

Calendar – New Entry

Host: Joan Smith

Save and Send Invitations    Save Draft    Delivery Options

What: Meeting ▼

Subject:

Required:

Start: ▼  ▼  End: ▼

Repeats  This entry does not repeat

Location:

Options: Remind me: 5 min before ▼  ☐ Request Confirmation

Invitees:

Description:

Attachments ▼

PRESCRIPTIVE MEETING RESOURCE RECOMMENDATION ENGINE USING CALENDAR INVITE CONTENT

BACKGROUND OF THE INVENTION

Field of the Invention

The present invention generally relates to organizational management, and more particularly to a method of facilitating the coordination of persons and resources for a meeting or similar event.

Description of the Related Art

Organizing a business meeting or similar event can take an excessive amount of time, yet it is important to the success of a meeting that all of the right participants are available and all of the appropriate resources to carry out the meeting are there. In the past these resources have included things like physical meeting rooms, chalkboards or whiteboards, visual projectors, etc., as well as convenience items such as food and drink. Currently many business meetings are of a virtual nature, that is, having no defined physical meeting space but instead relying on computers and networks such as the Internet to enable communications between all the participants. Even virtual meetings require resources such as collaborative meeting software, web conferencing, or videoconferencing applications. Conventional telephone networking may also be required.

An employee might be responsible for scheduling many meetings for a business, often at regular intervals. It can be very tedious to create the required invitations with all of the attendant information and secure all of the meeting resources, particularly for more advanced meeting features. For example, a meeting may be partially virtualized, i.e., still requiring a physical meeting location (room) for some employees while enabling virtual attendance through a variety of tools and facilitators. A single person may be involved with several different teams working on different projects or deals, and a meeting for a given team may usually have the same people calling the same number, using the same web resources, etc. When someone is continually making such arrangements for a variety of meetings on different subjects and requiring different resources, it can be easy to make a mistake.

Software tools have been devised to help schedule such repetitive meetings. One such tool is described in U.S. Patent Application Publication no. 2016/0005005. A system analyzes past behavior patterns with respect to the subject, logistics and resources of communication events, followed by preparing ranked listings of which subjects, logistics, and resources are most likely to be used in a given situation. The predicted logistics may then include people to invite, time and date of the meeting, its duration, location, and anything else useful in helping potential participants gather together. The user can confirm the prediction or suggestion via user input such as a mouse click or a voice command.

SUMMARY OF THE INVENTION

The present invention in at least one embodiment is generally directed to a method of providing meeting recommendations by receiving a user meeting history for a particular user having a plurality of historical participants and a plurality of historical resources wherein each historical participant has a plurality of historical participant numeric scores respectively associated with at least some known natural language features and each historical resource has a plurality of historical resource numeric scores respectively associated with at least some of the known natural language features, receiving input text from the particular user, extracting a plurality of current natural language features from the input text, computing a current participant numeric score for each historical participant based on the current natural language features correlated with the historical participant numeric scores, computing a current resource numeric score for each historical resource based on the current natural language features correlated with the historical resource numeric scores, recommending one or more candidate participants based on the current participant numeric scores and one or more candidate resources based on the current resource numeric scores. The historical resources can include physical rooms, teleconference services, web meeting URLs, chat channels, and catering. In some embodiments the known natural language features and the current natural language features are chargrams. Any of the historical participant numeric scores and any of the historical resource numeric scores not associated with any of the current natural language features are preferably decreased to impart a "forgetfulness" to the associations. The candidate participants and candidate resources can be recommended by selecting those whose corresponding scores are greater than the median of all current participant scores or all current resource scores. The input text might be received from the particular user via a title field of an invitation template presented in a user interface of the computer system. After receiving user confirmation of the recommendations, the system can take appropriate action such as electronically sending invitations to the candidate participants and making reservations for the candidate resources.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

FIG. 3 is a table showing an exemplary feature data store (map) in accordance with one implementation of the present invention;

FIGS. 4A-4C are screenshots of a computer display showing how the invention can provide for a progressive type-ahead in various fields of a proposed meeting invitation in accordance with one implementation of the present invention.

DESCRIPTION OF THE PREFERRED EMBODIMENT(S)

For event planners and business managers, coordinating logistics for a meeting or other event can be difficult and time consuming. Different groups can have many different meeting resource combinations making it hard to keep track of all requirements. While tools such as the meeting prediction system of U.S. Patent Application Publication no. 2016/0005005 facilitate the process, such systems can oversimplify meeting coordination and mistakes are still possible.

It would, therefore, be desirable to devise an improved method of meeting management which could more accurately predict meeting resource requirements. It would be further advantageous if the method could not only dynamically adapt but could also make appropriate adjustments based on usage over time. These and other advantages are achieved in a prescriptive meeting resource recommendation engine which automatically learns participant and resource preferences in the context of given meeting input data using natural language features, and automatically recommends all relevant participants and resources to the meeting creator. The engine uses a feature data store to associate specific persons and resources with various natural language features. In some embodiments the feature data store allows for self learning such that new features can be added over time, and additionally allows for self adaption by reducing the effect of aged inputs.

Figure 1:
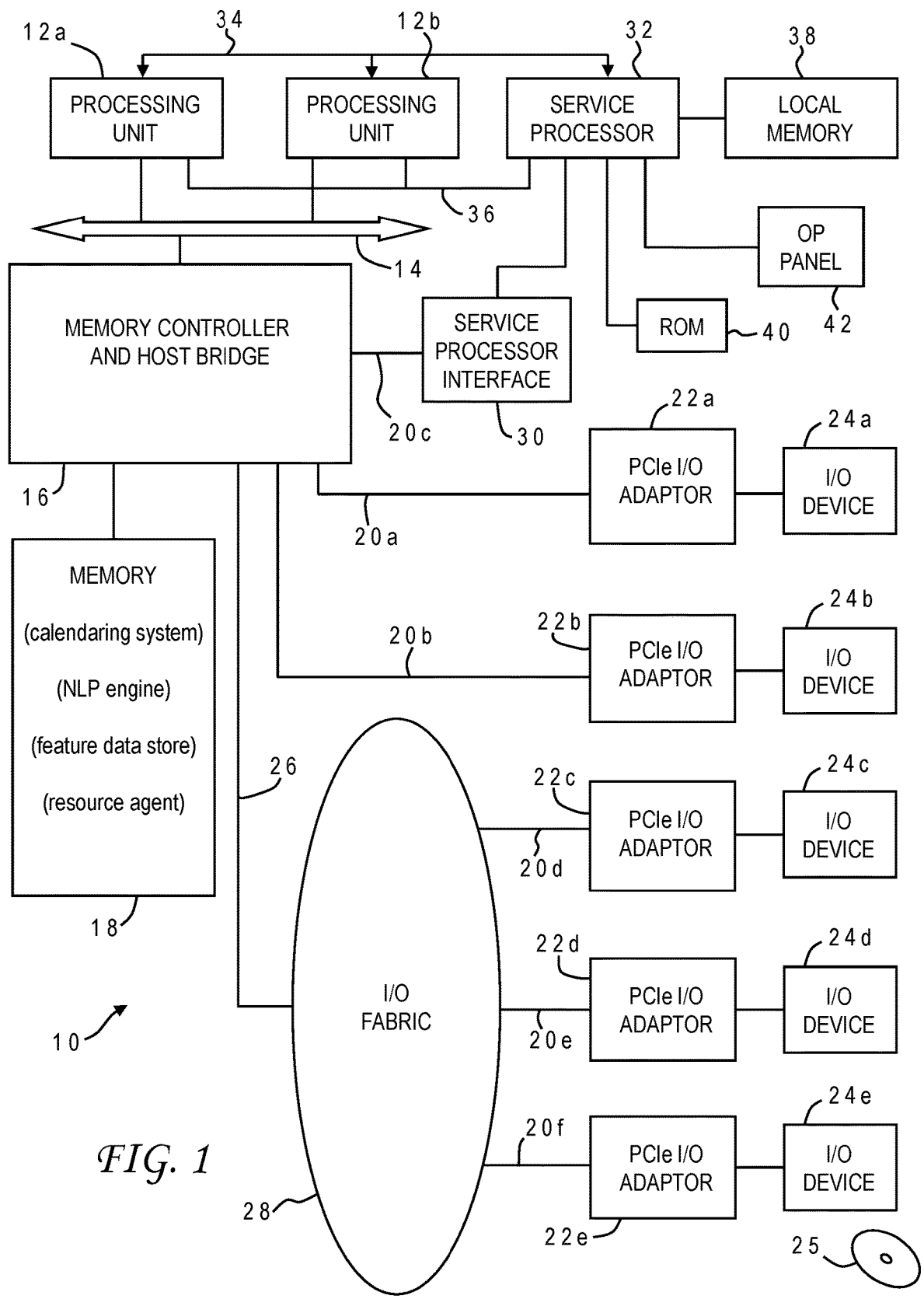
FIG. 1 is a block diagram of a computer system programmed to carry out resource recommendations for a calendaring system in accordance with one implementation of the present invention.

With reference now to the figures, and in particular with reference to FIG. 1, there is depicted one embodiment 10 of a computer system in which the present invention may be implemented to carry out resource recommendations for a calendaring system. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications or software modules in accordance with various implementations of the present invention, such as a calendaring system, a natural language processing (NLP) engine, and a feature data store described further below in conjunction with FIG. 3, which together form a prescriptive meeting resource recommendation engine. Memory 18 may also have a resource agent which takes information from the prescriptive meeting resource recommendation engine and secures various resources, such as by electronically making reservations, ordering teleconferencing services, requesting food/drink from a catering service, etc., any of which can be done using a network such as the Internet.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the prescriptive meeting resource recommendation engine of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a prescriptive meeting resource recommendation process that uses novel analytical techniques to manage meeting resources. Accordingly, a program embodying the invention may additionally include conventional aspects of various meeting management tools, and these details will become apparent to those skilled in the art upon reference to this disclosure.

Figure 2:
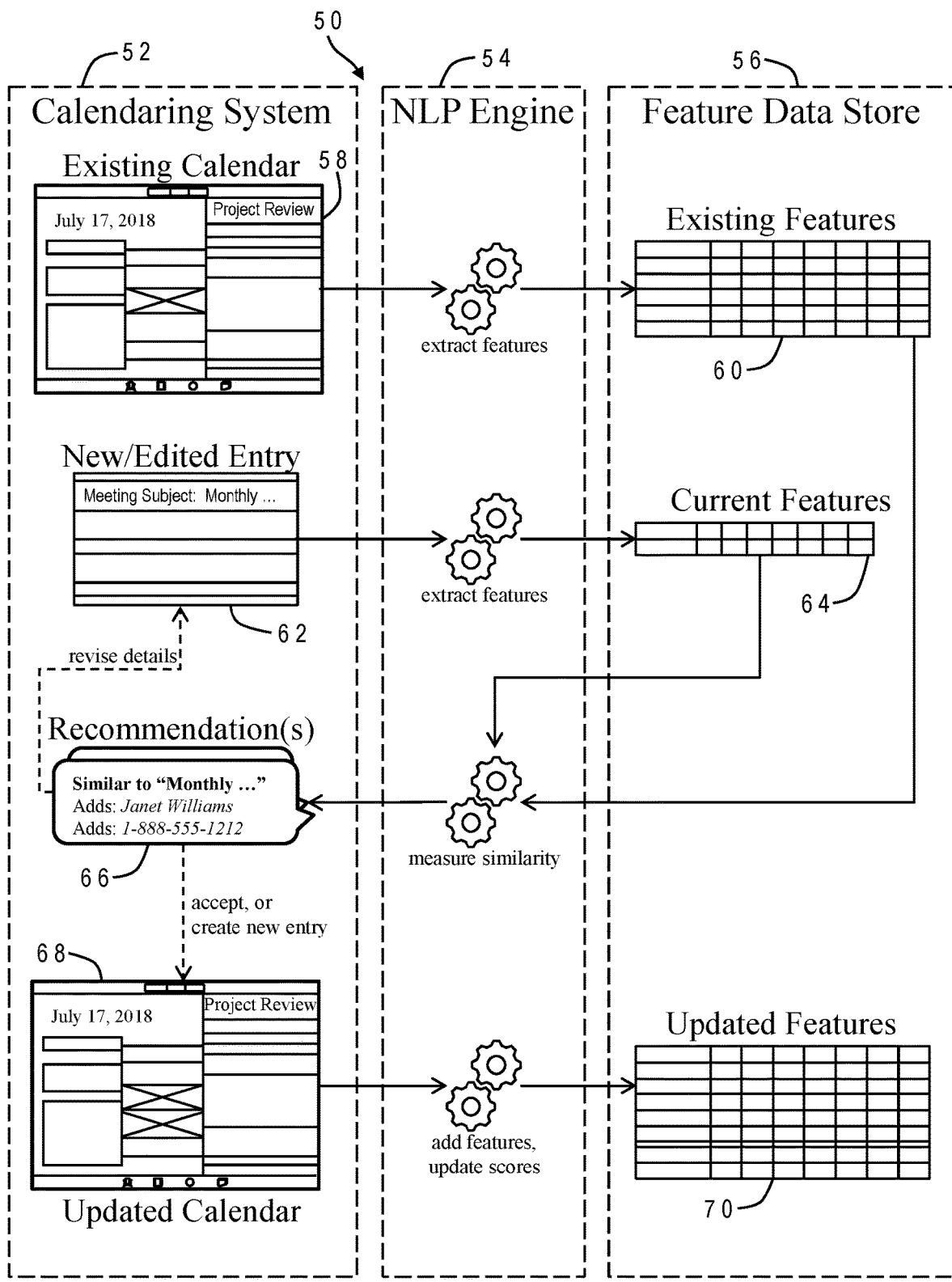
FIG. 2 is a pictorial representation of a prescriptive meeting resource recommendation process which includes a calendaring system, a natural language processing engine, and a feature data store in accordance with one implementation of the present invention.

Referring now to FIG. 2, there is depicted a prescriptive meeting resource recommendation engine 50 in accordance with one implementation of the present invention. Prescriptive meeting resource recommendation engine 50 may be carried out using computer system 10, or any other computing device such as a smartphone. Prescriptive meeting resource recommendation engine 50 includes a calendaring system 52, a natural language processing (NLP) engine 54, and a feature data store 56. In addition to the novel features disclosed herein, calendaring system 52 has conventional calendaring/scheduling functionality including the ability to send out invitations and the like to different participants. The calendaring system may be integrated with other services such as email, collaboration portals, interactivce video platforms, or social media sites.

Prescriptive meeting resource recommendation engine 50 uses existing calendar information 58 for a particular user (host) from calendar system 52 to create a set of existing features with arithmetic correlations to persons and resources. The gathering of this information may be initiated by the user through a user interface of calendaring system 52.

NLP engine 54 extracts natural language features from the existing calendar. These features may be for example be syntactic, lexical, relational or semantic. In the illustrative implementation NLP engine extracts chargrams but it could extract other natural language features. A chargram is a sequence of consecutive valid characters (e.g., excluding digits and punctuation) found in text. Further to this implementation the chargrams have three characters, i.e., 3-chargrams. For example, "ABI", "ABL", "ABO", etc., are all 3-chargrams. In English the most frequent 3-chargrams are "THE", "ING", "AND", and "ION". If a text input contained the phrase "In 1845 there was a princess", then the 3-character chargrams considered would be "THE", "HER", "ERE", "WAS", "PRI", "RIN", "INC", "NCE", "CES", and "ESS". An alternative implementation could allow punctuation or digits to be included; in such a case the sequences would also include "IN_", "N_1", "_18", "184", etc.

Feature data store 56 thus contains an index 60 of every 3-chargram encountered in the existing calendar information. That information can be for currently scheduled (i.e., future) events as well as previous events, and can comprise any text selected by the system designer which is associated with the events as recorded in existing calendar 58, including but not limited to meeting subjects, agendas or more detailed descriptions. Index 60 can also be built over time as the user creates new meeting or event invitations. Each of these features has a set of numerical values or scores corresponding to respective persons, resources, or other data objects that have been associated with specific meetings as also recorded in existing calendar 58. The data objects may for example include materials that various participants should bring to the meeting, or start times and durations, as well as specific meeting titles and complete agendas/descriptions. Those persons, resources and data objects can be extracted by using any of the known data fields of calendaring system 52. The scores may be computed according to different techniques as discussed below in conjunction with FIG. 3. These values constitute a statistical basis for making recommendations of participants, resources and other data objects to be included in new meetings initiated by the same user. Weights linking participants and topics to required resources can also be stored.

Thereafter the user can begin to create a new meeting by entering a title (or partial title) in the title field of an electronic invitation template 62 generated by calendar system 52 and/or entering text in an agenda field or similar description field of the invitation template. NLP engine 54 then generates features from the entered text, i.e., 3-chargram feature sets 64. The current features in feature sets 64 are compared to the features from index 60. Different numerical techniques for measuring the similarity of feature sets can be used, as described further below in conjunction with FIG. 3. Using the self learning, self adaptive feature data store, the features deemed sufficiently similar can be used to generate recommendations 66, such as invitees (individuals or a predefined group), resources (rooms, teleconference, web meeting URLs, Slack channels, catering, etc.), and other invitation information. A progressive type-ahead capability can be included based on the title or agenda/description as described further below in conjunction with FIGS. 4A-4C. This capability progressively narrows down recommendation options as the user types.

The user can accept or reject the recommendations. If any of the recommendations are rejected, an edited invitation template can be presented excluding the rejected recommendation(s) or otherwise revising invitation details according to user adjustments, whereupon NLP engine 54 can re-examine the entry. If the user accepts the recommendations, an updated calendar entry 68 is created. The updated entry can now be examined by NLP engine 54 to generate new features or reinforce existing features, updating feature data store 56 with the updated features 70. Feature data store 56 can further be subject to a "forgetfulness" routine which deflates particular scores over time if the corresponding objects have not recently been associated with a feature.

Appropriate action can also be taken based on the accepted invitation, i.e., sending it to the indicated recipients and making reservations for any required resources. Different devices can be used to communicate the invitation and any confirmations.

Prescriptive meeting resource recommendation engine may start with no existing calendar information. For example, Stefan has never used the calendar system before and then schedules a meeting with Kristi, Sarah, and Victor on Brian's telephone line, with the subject (title) "Project A". At this point the history data store is empty, so the system recommends nothing, but this meeting becomes first entry and can immediately be leveraged. When Stefan begins to create a new meeting invitation at a later date with Kristi, Sarah and Victor as attendees, and the subject "Project A", the system looks at the history and finds the first entry to be similar, so prompts: "Add location 'Brian's line'?" which is the only object (in this case, resource) missing from the tentative invitation. The system has no knowledge of the missing element's meaning, only that it is missing.

FIG. 3 shows an exemplary feature data store (map) 56' in accordance with one implementation of the present invention. Each row represents scores or weights for a particular feature "Feature 1", "Feature 2", . . . , "Feature N", e.g., a particular 3-chargram. According to this example the first feature has medium correlation with "Person 1" (a score of 2.546), a lesser correlation with "Person 2" (a score of 1.125), and no correlation with other persons. The first feature also has a high correlation with a particular location "Room X", a particular title "Title 1", a particular agenda description "Agenda 1" and a particular data object "Object 1" (scores of 4.5 each). Other features have different scores for these different persons, resources and objects.

The illustrative implementation may be further understood with reference to the following algorithms represented in pseudocode, which together to carry out the reinforcement, learning-based meeting resource proposal system. The first algorithm is "extract-chargams" which generates the NLP features:

```
function EXTRACT-CHARGRAMS(text) //a list of all chargrams for text
    chargrams3 = [ text[i:i+2] for i in range(len(text) − 2) ]
    return unique(chargrams3)
end function
```

This first algorithm just steps through the text from the beginning to the end in 3-character sets. The "unique" routine ensures that redundant 3-chargrams are folded in, i.e., no separate entry is created. The second algorithm is "process-meeting-submission-and-reinforce-features" which extracts meeting features and provides reinforcement of existing features:

```
function PROCESS-MEETING-SUBMISSION-AND-REINFORCE-FEATURES(meeting)
    //extract features & reinforce all participants and resources in each feature
    meeting-features = EXTRACT-CHARGRAMS(meeting.title)
    meeting-features.concat(EXTRACT-CHARGRAMS(meeting.body))
    for each feature F in meeting-features do
        if F not in feature-data-store then
            Initialize F in feature-data-store
        end if
        for each participant in meeting do
            Reinforce participant score in F in feature-data-store
            //e.g. score + = 1.0 or some other numerical update
        end for
        for each resource in meeting do
            Reinforce resource score in F in feature-data-store
            //e.g. score + = 1.0 or some other numerical update
        end for
    end for
    APPLYFORGETTINGFACTOR(meeting-features)
end function
```

This second algorithm looks at the title and main description (body) of an invitation and builds the feature data store in the first "if" statement. The two nested "for" loops reinforce participant and resource scores, respectively, such as by adding some predetermined value (1 in this example) to a score each time the particular meeting feature is found for the same participant/resource. The last line of the function invokes the "forgetfulness" routine which is the third algorithm "applyForgettingFactor":

```
function APPLYFORGETTINGFACTOR(features-subset)
    //Proportionally decrease all scores for each feature relative to other scores
    //Prevents stale data, adapts with updates, and keeps learning over time.
    for each feature F in features-subset do
        totalScore = row-wise sum of scores for all participants & resources
            of F for each participant/resource score S in F do
        S_new = [ (totalScore − score)/totalScore ] × score
        Update score F = S_new in feature F in feature-data-store
        end for
    end for
end function
```

This third algorithm incrementally decreases the score based on the value of the score relative to all scores for the feature, i.e., the sum of scores in a given row of the feature data store.

According to this implementation the amount of reduction is proportional to the size of the score/weight relative to peers, so large scores would be reduced significantly but small scores would be reduced only slightly. Thus if a given feature is not associated with a particular person or resource over a long period of time, that person or resource will effectively be phased out of correlation with the feature. The fourth algorithm is "make-meeting-proposal" which generates the recommendations:

```
function MAKE-MEETING-PROPOSAL(text)
    //Given even a partial text, propose relevant participants and resources
    text-features = extract-chargrams(text)
    for each participant P do
        P_total = 0
        for each feature F in text-features do
            P_total += participant score in F
        end for
    end for
    for each resource R do
        R_total = 0
        for each feature F in text-features do
            R_total += resource score in F
```

-continued

```
        end for
    end for
    M_P = the median over all participant totals.
    M_R = the median over all resource totals.
    return Participants where P_total ≥ M_P and resources where P_total ≥ M_R
end function
```

This last algorithm creates an overall participant score for a particular participant in the first outer "for" loop by summing any scores for that participant corresponding to features found in the text or partial text, and creates an overall resource score for a particular resource in the second outer "for" loop by summing any scores for that resource corresponding to features found. In this implementation any participant or resource is included in the recommendation if its overall score is greater than or equal to (or just greater than) the median of all participant scores or the median of all resource scores, respectively. Different thresholds other than the medians could be used in alternative implementations using other statistical values.

Figure 4B:
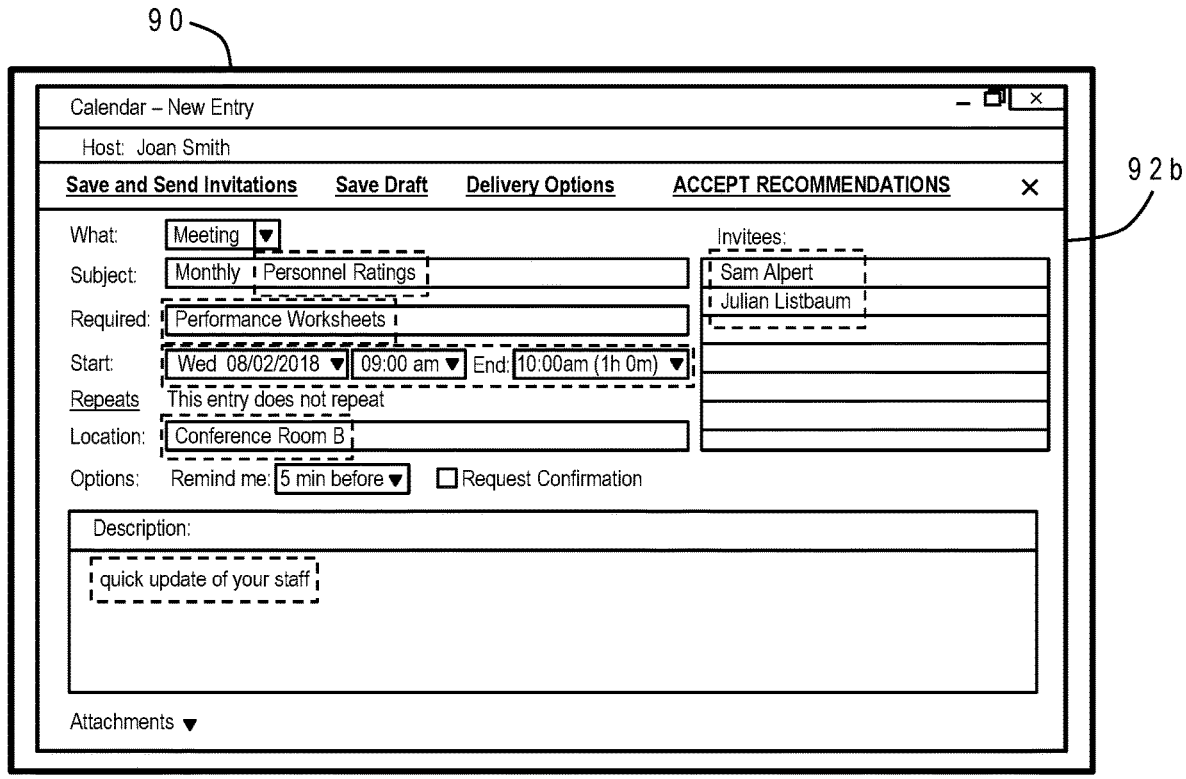
Figure 4C:
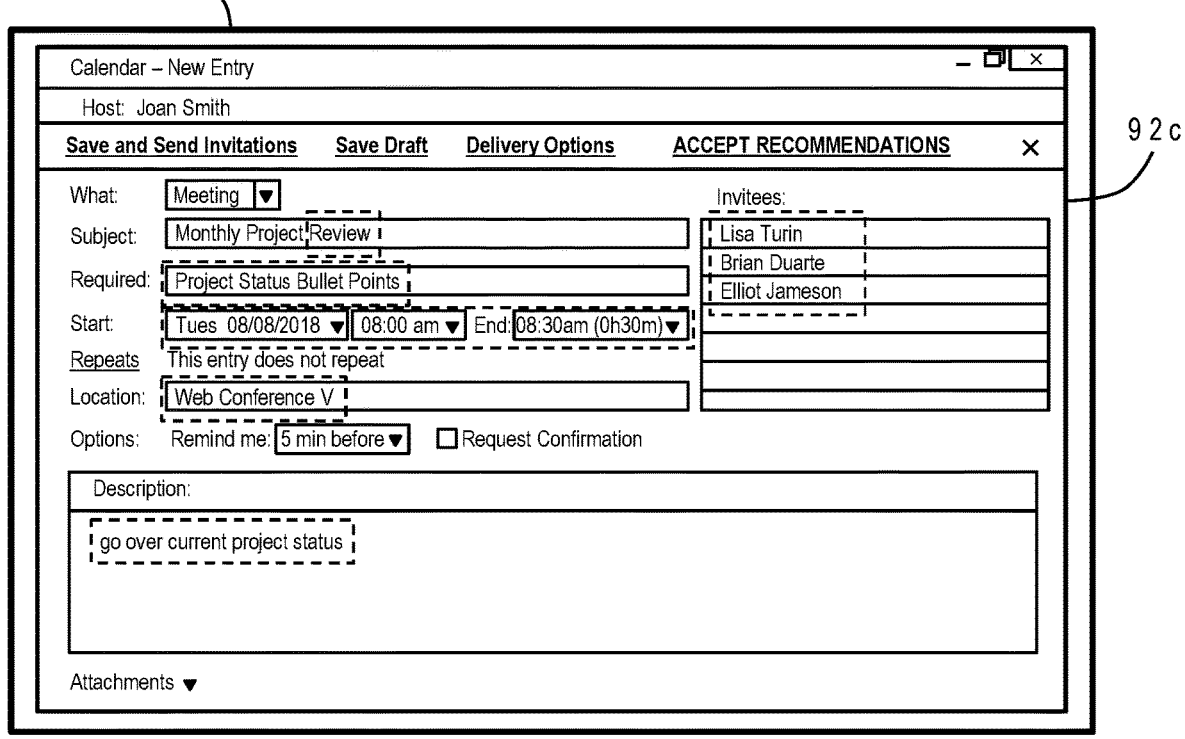

This last algorithm can be continually invoked as a host is preparing an invitation or other electronic document to create a meeting or other event, changing the recommendations in real-time. In some implementations the invention can provide a progressive type-ahead in various fields of the proposed meeting invitation as text is being entered in the title or description fields. FIGS. 4A-4C are screenshots showing this progressive type-ahead feature on a display device 90 of a computer, such as computer system 10. In this example the host is Joan Smith. FIG. 4A shows a blank invitation template 92a which has not yet been filled in with any text or other data. Certain fields may be populated with default values, such as the event being a "Meeting", and a notification alert set for five minutes before the event. Other fields in this example include invitees, a subject, required materials, start and end times (end time can be calculated based on the start time and an input duration), a location, and a full description. The user interface forming the template may also include various menus or commands. In this implementation the template begins with three commands: "Save and Send Invitations" which will send out the invitation to the designated invitees; "Save Draft" which will save a partially filled-in template for later completion; and "Delivery Options" which opens up a dialog window (not shown) to allow the user to adjust various settings.

FIG. 4B shows an updated invitation template 92b in which the host has entered only the word "Monthly" in the title field (so far). Based on this partial text, and the host's meeting history, the prescriptive meeting resource recommendation engine finds that the title "Monthly Personnel Ratings" is the most likely candidate to complete the invitation, along with certain invitees (Sam Alpert and Julian Listbaum) and resources (location in Conference Room B, required materials include Performance Worksheets). The engine's scoring routine also suggests that the time should be the next Wednesday at 9:00 am and last one hour, and suggests that the description for the meeting should be "quick update of your staff". All of these suggestions are presented by the engine via the calendaring system user interface in the appropriate fields of the template, as indicated by the dashed-line boxes. A new command also appears "ACCEPT RECOMMENDATIONS" which can be activated by the host using the touch screen, mouse or other graphical pointing device. However, as it turns out in this example, the host is not wanting to schedule a personnel ratings meeting. Rather, she wants to schedule the monthly project review meeting. She accordingly continues to type the word "Project" in the subject field whereupon the template recommendations change as seen in FIG. 4C. The title now has a suggestion of "Review" for the last word, with a complete change in invitees (Lisa Turin, Brian Duarte, Elliot Jameson), resources (Web Conference V), and other data (meeting time Tuesday at 8:00 am for a half hour, and description "go over current project status"). The user can click on the "ACCEPT RECOMMENDATIONS" command to lock in these selections, and can then transmit the invitations via the "Save and Send Invitations" command.

Multiple candidates for a single field based on the text entered so far can be suggested, for example, by presenting a drop-down pane for the corresponding field with the candidates listed on multiple lines in the pane. In this case the user can select a recommendation using a graphical pointing device of the computer system, i.e., clicking on the selection. In this manner the various embodiments of the invention can automatically recommend all appropriate channels based on any of the invitation data, drastically reducing omission errors and speeding up meeting creation.

The recommendation engine can be keyed off of other fields besides the title or description. For example, a host might start creating an invitation by entering the first invitee, and the system could fill in the title/subject field based on the feature scoring. Features can also be extracted from calendar entries where the calendar owner is a participant only, not just those where the calendar owner is the meeting host (tribal knowledge).

While the invention has heretofore been described in conjunction with an email or similar system which sends electronic invitations or notices, it is not so limited and can be applied to a wide variety of situations. The following embodiments represent further variations but are still not to be construed in a limiting sense. In one embodiment a customer-managed relationships (CRM) system is utilized by a car dealership in scheduling customer services. Lots of customers schedule the same services every so often. The service technician can accordingly create work orders for different customers using suggestions from the recommendation engine. In another embodiment the engine makes recommendations for a chat platform such as Slack. The recommendations can include users to invite to channels, or when to move conversations to new channels. In an alternative embodiment, an enterprise resource management system uses the engine to provide recommendations of equipment and skilled resources for specialized jobs.

Figure 5:
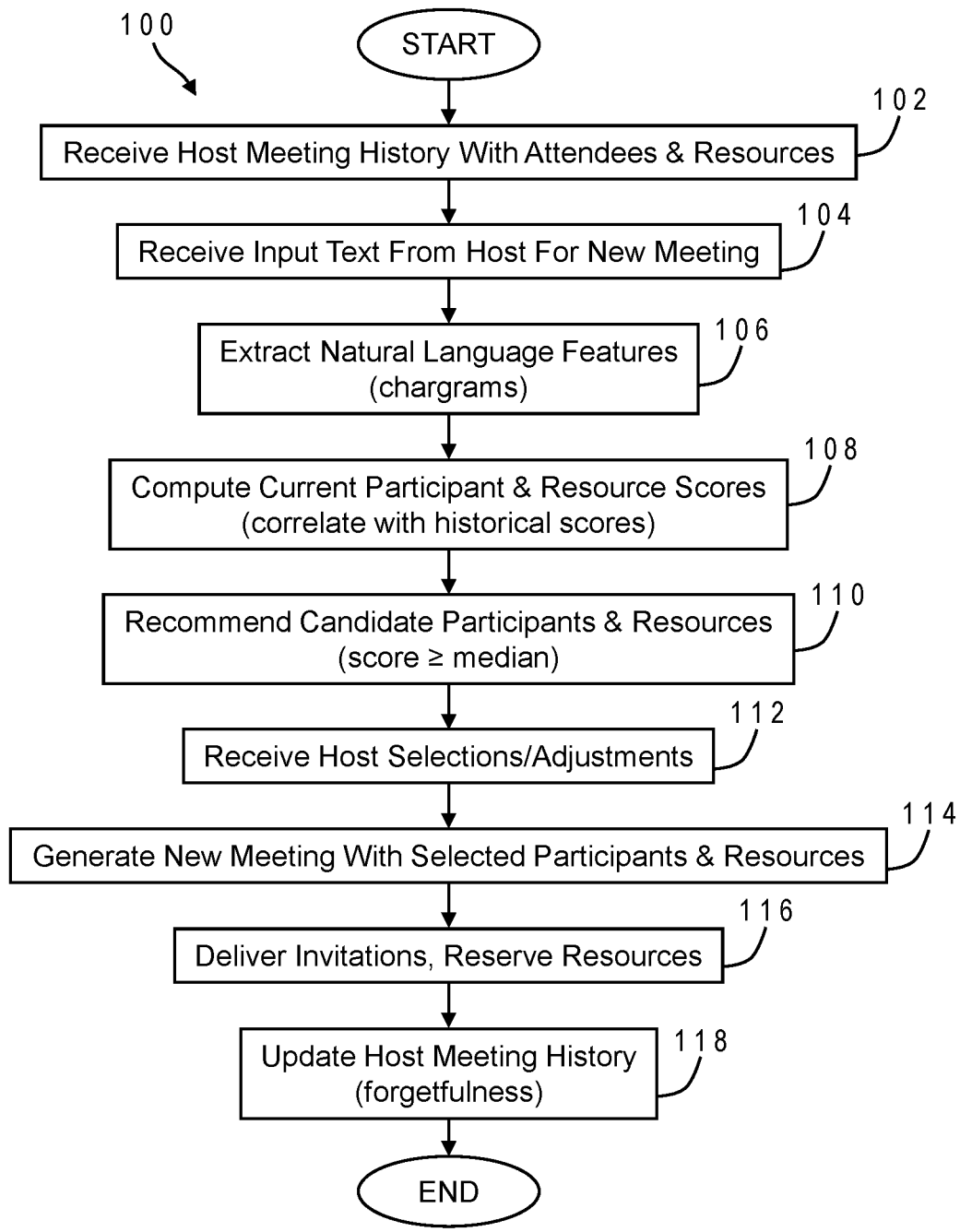
FIG. 5 is a chart illustrating the logical for a prescriptive meeting resource recommendation process in accordance with one implementation of the present invention.

The present invention may be further understood with reference to the chart of FIG. 5 which illustrates the logical flow for a prescriptive meeting resource recommendation process 100 in accordance with one implementation of the present invention. Process 100 begins when the computer system or computing device receives a host meeting history with attendees and resources (102). This history may be built up over time on the particular computing device or may be transferred from another device. The device then receives input text from a meeting host or other event planner as part of the creation of the event (104). The text may in particular be entered in the title or subject field of the user interface for the invitation template, but may more generally be in any field. As the text is being entered, natural language features (e.g., 3-chargrams) are extracted (106), and as the features are determined they are compared to historical features to identify participant and resource scores (108). Based on the scores (e.g., using a median score as a cutoff) the recommendation engine suggests different candidates for participants and resources, or other data (110). The computing device will then receive any user selections/confirmations or other adjustments to the invitation data (112). The calendaring system can take the selections to generate the new meeting data (114), and deliver the invitations to designated participants as well as reserving any necessary resources (116). The recommendation engine can thereafter update the feature data store (host meeting history) using the current meeting details (118). This update can also include the forgetfulness routine.

The invention in its various embodiments thereby automatically learns participants and resource preferences in the context of given meeting data such as a simple title. The recommendation engine is context-aware, providing improved accuracy, e.g., the same three participants always get the meeting specific resource proposals for a specific meeting context. This approach is furthermore technology agnostic: the invention can be implemented across any technology (email platforms, social media platforms, web meeting schedulers, etc.).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been described primarily with regard to business meetings but it is not so limited; the invention can be applied to any kind of event involving people and resources, such as project management, weddings, seminars, birthdays, promotions, concerts, etc. It is therefore contemplated that such modifications can be made without departing from the spirit or scope of the present invention as defined in the appended claims.

What is claimed is:

1. A method of providing meeting recommendations comprising:
   receiving a user meeting history for a particular user having a plurality of historical participants and a plurality of historical resources wherein each historical participant has a plurality of historical participant numeric scores respectively associated with at least some known natural language features and each historical resource has a plurality of historical resource numeric scores respectively associated with at least some of the known natural language features, by executing first instructions in a computer system;
   receiving input text from the particular user, by executing second instructions in the computer system;
   extracting a plurality of current natural language features from the input text, by executing third instructions in the computer system;
   computing a current participant numeric score for each historical participant based on the current natural language features correlated with the historical participant numeric scores, by executing fourth instructions in the computer system;
   computing a current resource numeric score for each historical resource based on the current natural language features correlated with the historical resource numeric scores, by executing fifth instructions in the computer system; and
   recommending one or more candidate participants based on the current participant numeric scores and one or more candidate resources based on the current resource numeric scores, by executing sixth instructions in the computer system.

2. The method of claim 1 wherein the historical resources are selected from a group consisting of physical rooms, teleconference services, web meeting URLs, chat channels, and catering.

3. The method of claim 1 wherein the known natural language features and the current natural language features are chargrams.

4. The method of claim 1 further comprising decreasing any of the historical participant numeric scores and any of the historical resource numeric scores not associated with any of the current natural language features.

5. The method of claim 1 wherein:
   each of the recommended candidate participants has a current participant numeric score which is greater than a median of all of the current participant numeric scores; and
   each of the recommended candidate resource has a current resource numeric score which is greater than a median of all of the current resource numeric scores.

6. The method of claim 1 wherein the input text is received from the particular user via a title field of an invitation template presented in a user interface of the computer system.

7. The method of claim 1 further comprising:
   receiving a confirmation of the candidate participants and the candidate resources from the particular user; and
   electronically sending invitations to the candidate participants and making reservations for the candidate resources.

8. A computer system comprising:
   one or more processors which process program instructions;
   a memory device connected to said one or more processors; and
   program instructions residing in said memory device for providing meeting recommendations by receiving a user meeting history for a particular user having a plurality of historical participants and a plurality of historical resources wherein each historical participant has a plurality of historical participant numeric scores respectively associated with at least some known natural language features and each historical resource has a plurality of historical resource numeric scores respectively associated with at least some of the known natural language features, receiving input text from the particular user, extracting a plurality of current natural language features from the input text, computing a current participant numeric score for each historical participant based on the current natural language features correlated with the historical participant numeric scores, computing a current resource numeric score for each historical resource based on the current natural language features correlated with the historical resource numeric scores, and recommending one or more candidate participants based on the current participant numeric scores and one or more candidate resources based on the current resource numeric scores.

9. The computer system of claim 8 wherein the historical resources are selected from a group consisting of physical rooms, teleconference services, web meeting URLs, chat channels, and catering.

10. The computer system of claim 8 wherein the known natural language features and the current natural language features are chargrams.

11. The computer system of claim 8 wherein the program instructions further decrease any of the historical participant numeric scores and any of the historical resource numeric scores not associated with any of the current natural language features.

12. The computer system of claim 8 wherein:
    each of the recommended candidate participants has a current participant numeric score which is greater than a median of all of the current participant numeric scores; and
    each of the recommended candidate resource has a current resource numeric score which is greater than a median of all of the current resource numeric scores.

13. The computer system of claim 8 wherein the input text is received from the particular user via a title field of an invitation template presented in a user interface of the computer system.

14. The computer system of claim 8 wherein the program instructions further receiving a confirmation of the candidate participants and the candidate resources from the particular user, and electronically send invitations to the candidate participants and make reservations for the candidate resources.

15. A computer program product comprising:
    a computer readable storage medium; and
    program instructions residing in said storage medium for providing meeting recommendations by receiving a user meeting history for a particular user having a plurality of historical participants and a plurality of historical resources wherein each historical participant has a plurality of historical participant numeric scores respectively associated with at least some known natural language features and each historical resource has a plurality of historical resource numeric scores respectively associated with at least some of the known natural language features, receiving input text from the particular user, extracting a plurality of current natural language features from the input text, computing a current participant numeric score for each historical participant based on the current natural language features correlated with the historical participant numeric scores, computing a current resource numeric score for each historical resource based on the current natural language features correlated with the historical resource numeric scores, and recommending one or more candidate participants based on the current participant numeric scores and one or more candidate resources based on the current resource numeric scores.

16. The computer program product of claim 15 wherein the historical resources are selected from a group consisting of physical rooms, teleconference services, web meeting URLs, chat channels, and catering.

17. The computer program product of claim 15 wherein the known natural language features and the current natural language features are chargrams.

18. The computer program product of claim 15 wherein the program instructions further decrease any of the historical participant numeric scores and any of the historical resource numeric scores not associated with any of the current natural language features.

19. The computer program product of claim 15 wherein:
  each of the recommended candidate participants has a current participant numeric score which is greater than a median of all of the current participant numeric scores; and
  each of the recommended candidate resource has a current resource numeric score which is greater than a median of all of the current resource numeric scores.

20. The computer program product of claim 15 wherein the input text is received from the particular user via a title field of an invitation template presented in a user interface of a computer system.

\* \* \* \* \*